United States Patent
Feltham et al.

(10) Patent No.: US 10,296,565 B2
(45) Date of Patent: May 21, 2019

(54) OPTIMIZED BROWSER OBJECT RENDERING

(71) Applicant: INTERNATIONAL BUSINESS MACHINES CORPORATION, Armonk, NY (US)

(72) Inventors: Andrew S. Feltham, Chandlers Ford (GB); Robert S. Smart, Chandlers Ford (GB); Graham White, Alton (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 27 days.

(21) Appl. No.: 15/408,647

(22) Filed: Jan. 18, 2017

(65) Prior Publication Data
US 2018/0203828 A1    Jul. 19, 2018

(51) Int. Cl.
*G06F 17/22* (2006.01)
*G06T 15/40* (2011.01)

(52) U.S. Cl.
CPC .......... *G06F 17/2247* (2013.01); *G06F 17/22* (2013.01); *G06T 15/40* (2013.01)

(58) Field of Classification Search
CPC ....... G06T 11/001; G06T 15/04; G06T 11/40; G06T 11/00; G06F 3/14; G06F 17/2247; G06F 17/30861; G09G 5/02; G09G 5/363
See application file for complete search history.

(56) References Cited

U.S. PATENT DOCUMENTS

| | | | |
|---|---|---|---|
| 6,574,360 B1 * | 6/2003 | Berdardini | G06T 15/40 345/419 |
| 8,020,089 B1 * | 9/2011 | Brichford | G06F 17/2247 715/234 |
| 2007/0273711 A1 * | 11/2007 | Maffei | G06T 13/40 345/630 |

(Continued)

OTHER PUBLICATIONS

"Hidden Surface Determination", Wikipedia, https://en.wikipedia.org/wiki/Hidden_surface_determination, last modified Oct. 2, 2016, 5 pages.

(Continued)

*Primary Examiner* — Stephen S Hong
*Assistant Examiner* — Ahamed I Nazar
(74) *Attorney, Agent, or Firm* — Nicholas Bowman; Andrew D. Wright; Roberts Mlotkowski Safran Cole & Calderon, P.C.

(57) ABSTRACT

Optimizing the rendering of objects in a Web browser view is described. A Web browser system includes: a processor, a computer readable memory, and a computer readable storage medium associated with a computer device; program instructions of an object model configured to organize objects in layers including a lower layer and one or more higher layers; program instructions of a rendering engine for loading two or more objects from a server into the layers of the object model and for rendering selected objects in a Web browser view; program instructions of an object selection engine configured to select two or more loaded objects in the object model for display in the client browser view; and (Continued)

program instructions of an object deselection engine configured to deselect one or more selected objects in a lower layer that are occluded by one or more objects in a higher layer or above.

10 Claims, 7 Drawing Sheets

(56) References Cited

U.S. PATENT DOCUMENTS

| | | | | |
|---|---|---|---|---|
| 2012/0240063 | A1* | 9/2012 | Andrade | G06F 17/30905 715/760 |
| 2012/0320073 | A1* | 12/2012 | Mason | G06F 3/1431 345/581 |
| 2013/0093780 | A1* | 4/2013 | Egan | G06T 15/405 345/581 |
| 2013/0235050 | A1* | 9/2013 | Karras | G06T 1/20 345/505 |
| 2014/0245127 | A1* | 8/2014 | Brenzel | G06T 11/60 715/234 |
| 2015/0193401 | A1 | 7/2015 | Kim | |
| 2015/0279058 | A1 | 10/2015 | Dong et al. | |
| 2017/0085867 | A1* | 3/2017 | Baran | H04N 13/122 |

OTHER PUBLICATIONS

"Occlusion Culling", Unity Manual, https://docs.unity3d.com/Manual/OcclusionCulling.html, Accessed Dec. 9, 2016, 9 pages.

Wiltzius, "Accelerated Rendering in Chrome", The Layer Model, https://www.html5rocks.com/en/tutorials/speed/layers/, Mar. 11, 2013, 16 pages.

"DocumentElementFromPoint( )", Mozilla Developer Network, https://developer.mozilla.org/en-US/docs/Web/API/Document/elementFromPoint, Accessed Dec. 9, 2016, 3 pages.

"Element.getBoundingClientRect( )", Mozilla Developer Network, https://developer.mozilla.org/en-US/docs/Web/API/Element/getBoundingClientRect, Accessed Dec. 9, 2016, 4 pages.

Lewis, "Avoiding Unnecessary Paints: Animated GIF Edition", https://www.html5rocks.com/en/tutorials/speed/animated-gifs/, Oct. 21, 2013, 5 pages.

Reveman, "Add Occlusion Culling to GL Compositor", Google Chromium OS Reviews, https://groups.google.com/a/chromium.org/forum/#!msg/chromium-os-reviews/5MqZ0D1reWo/8yn4GsMrLIUJ, Jun. 8, 2011, 1 pages.

Woodrow, "Bug 1085223—Add a Full Occlusion Culling Pass to LayerManagerComposite", Bugzilla, https://bugzilla.mozilla.org/show_bug.cgi?id=1085223, Feb. 27, 2015, 4 pages.

Vugt, "Visibility/Occlusion Culling Can Hide Surfaces Prematurely If Only Their Decorations Are Visble", MIR, https://bugs.launchpad.net/mir/+bug/1299977, Mar. 31, 2014, 3 pages.

* cited by examiner

OPTIMIZED BROWSER OBJECT RENDERING

BACKGROUND

The present invention relates to a method and apparatus for optimized browser object rendering.

With the introduction of HTML 5 (hypertext markup language version 5) and CSS 3 (cascading style sheets version 3) the capabilities of Internet applications have been getting significantly better. This has intensified the need for Internet browsers to become more powerful and capable as more and more things are done on the client side. In particular with the prominence of mobile devices every optimization that can be made, is included in the core product in order to give a better and better experience to the end user.

The background to this invention is a process called occlusion culling, or hidden surface detection. This typically applied in the field of 3D modelling in order to optimize rendering time. Occlusion culling is used to eliminate objects that are obscured by other objects within the viewport of the scene.

SUMMARY

In a first aspect of the invention there is provided a Web browser system including: a processor, a computer readable memory, and a computer readable storage medium associated with a computer device; program instructions of an object model configured to organize objects in layers including a lower layer and one or more higher layers; program instructions of a rendering engine for loading two or more objects from a server into the layers of the object model and for rendering selected objects in a Web browser view; program instructions of an object selection engine configured to select two or more loaded objects in the object model for display in the client browser view; and program instructions of an object deselection engine configured to deselect one or more selected objects in a lower layer that are occluded by one or more objects in a higher layer or above. The program instructions are stored on the computer readable storage medium for execution by the processor via the computer readable memory.

In a second aspect of the invention there is provided a computer implemented method for managing rendering of objects in a client browser view, said client browser having an object model for organizing graphical objects in layers including in a lower layer and one or more higher layers. The method includes: loading, by a computer device, two or more objects from a server into one or more of the lower layer and the one or more higher layers of the object model; selecting, by the computer device, two or more loaded objects in the object model for display in the client browser view; deselecting, by the computer device, one or more selected objects in a lower layer that are occluded by one or more graphical objects in a higher layer or above; and rendering, by the computer device, the objects that remain selected.

According to a third aspect of the invention there is provided a computer program product for managing rendering of objects in a client browser view, said client browser having an object model for organizing objects in layers including in a lower layer and one or more higher layers, the computer program product comprising a computer readable storage medium having program instructions embodied therewith. The program instructions are executable by a processor to cause the processor to: load two or more objects from a server into one or more of the lower layer and the one or more higher layers of the object model; select two or more loaded objects in the object model for display in the client browser view; deselect one or more selected objects in a lower layer that are occluded by one or more objects in a higher layer or above; and render the objects that remain selected.

Aspects of the invention use the principles of occlusion culling such that graphical objects in an Internet document object model (DOM) that are obscured by other solid graphical objects are not rendered when updates are required. This benefits from the fact that browsers already render graphical objects in layers. In this manner, implementations improve the rendering performance of a computer device.

BRIEF DESCRIPTION OF THE DRAWINGS

Preferred embodiments of the present invention will now be described, by way of example only, with reference to the following drawings in which.

DETAILED DESCRIPTION

Figure 1A:
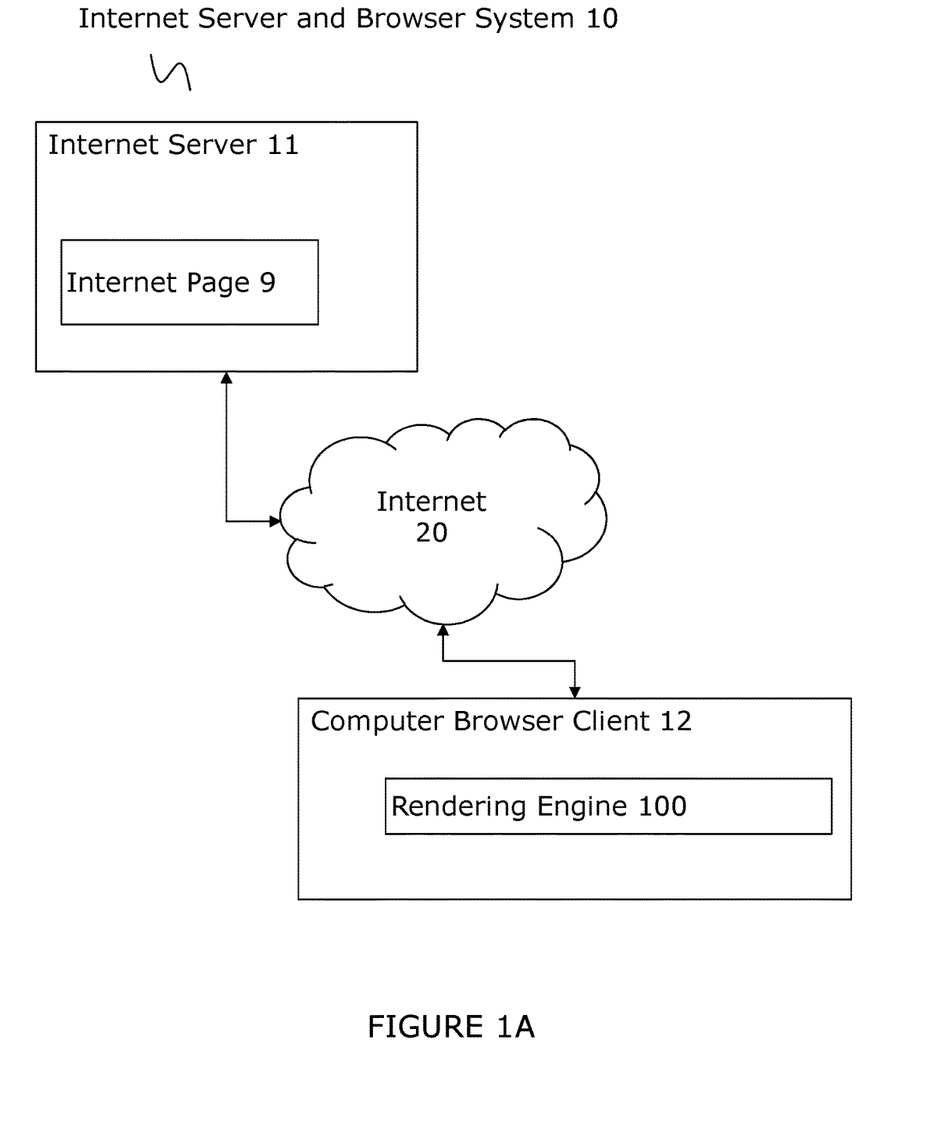
FIG. 1A is a deployment diagram of an Internet server and browser system in accordance with aspects of the invention.

Referring to FIG. 1A, embodiments of the present invention are realized in the form of an Internet server and browser system 10 comprising Internet server 11 and computer browser client 12. Internet server 11 connects to computer browser client 12 via Internet 20 and is adapted for serving an Internet page 9 comprising objects and graphical objects to a requesting computer browser client. In the preferred embodiment, computer browser client 12 comprises rendering engine 100 and browser occlusion engine 200 described in more detail below. Although the embodiments are described in terms of an Internet server and browser system, other embodiments are envisaged that can use any application server and browser with an application protocol for distributed, collaborative, hypermedia information systems. An application protocol is protocol based on requests and corresponding responses.

Figure 1B:
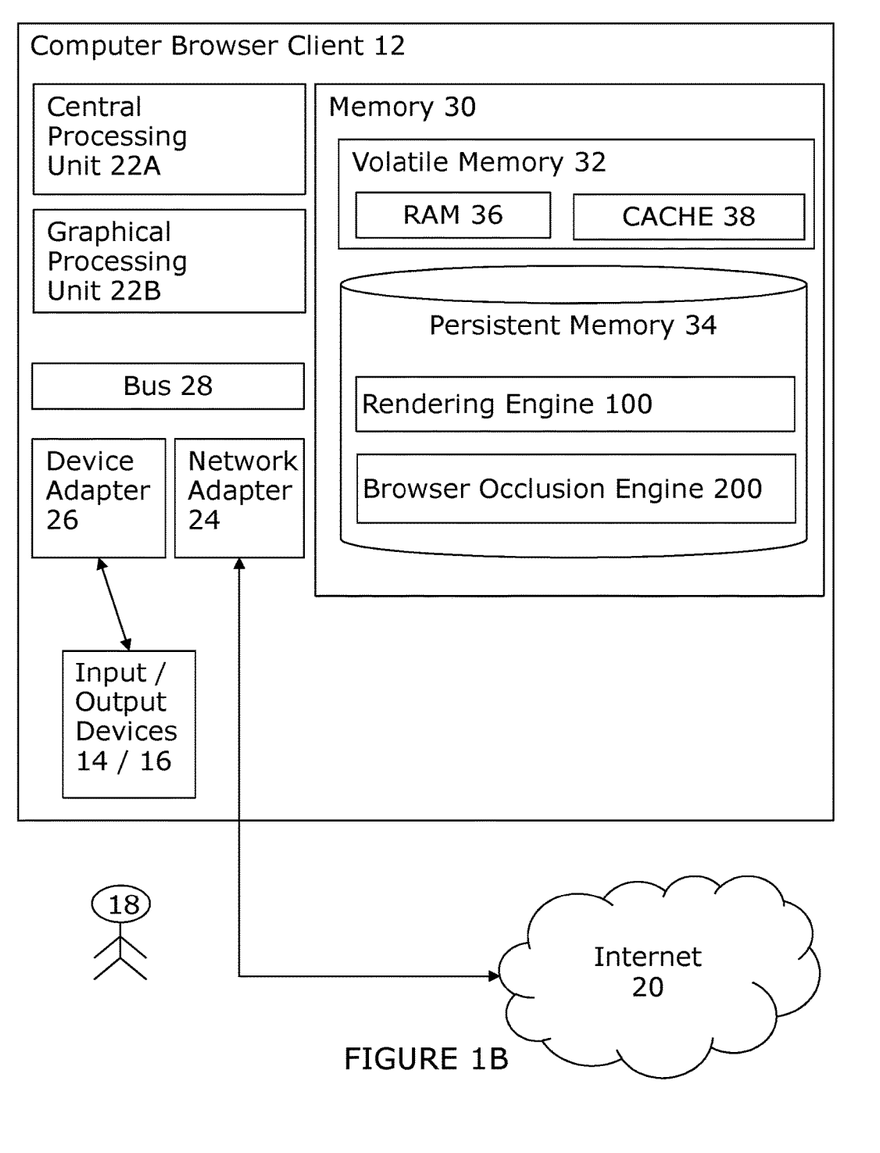
FIG. 1B is a deployment diagram of the browser system in accordance with aspects of the invention.

Referring to FIG. 1B, the deployment of an embodiment of the computer browser client 12 is described. Computer browser client 12 is operational with numerous other general purpose or special purpose computing system environments or configurations. Examples of computing processing systems, environments, and/or configurations that may be suitable for use with computer browser client 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment for example where a computer processing system is a third party service performed by one or more of a plurality of computer processing systems. A distributed computer environment also includes an Internet of things computing environment for example where computer processing systems are distributed as a network of objects that can interact with a computing service.

Computer browser client 12 may be described in the general context of computer system-executable instructions, such as program modules, being executed by a computer processor. Generally, program modules may include routines, programs, objects, components, logic, and data structures that perform particular tasks or implement particular abstract data types. Computer browser client 12 may be embodied in distributed cloud computing environments where tasks are performed by remote processing devices that are linked through a communications network. In a distributed cloud computing environment, program modules may be located in both local and remote computer system storage media including memory storage devices.

In embodiments, computer browser client 12 is connected to the Internet 20. Computer browser client 12 communicates with a user 18 using input devices 14 and output devices 16. Input devices 14 may include one or more of: a keyboard, a scanner, a mouse, trackball or another pointing device. Output devices 16 may include one or more of a display or a printer. Computer browser client 12 communicates with network devices (not shown) over Internet 20. Internet 20 could also be a local area network (LAN) or a wide area network (WAN).

In embodiments, computer browser client 12 comprises: input and output devices 14/16; central processing unit (CPU) 22A; graphical processing unit (GPU) 22B; network adapter 24; device adapter 26; bus 28 and memory 30.

CPU 22A and GPU 22B load machine instructions from memory 30 and perform machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register.

In embodiments, CPU 22A performs many different machine operations but GPU 22B specializes in rendering graphical objects on the output device.

Both CPU 22A and GPU 22B process machine instructions. A set of machine instructions is called a machine code program, the machine instructions are written in a machine code language which is referred to a low level language. A computer program written in a high level language is compiled to a machine code program before it can be run. Alternatively, a machine code program such as a virtual machine or an interpreter can interpret a high level language in terms of machine operations.

Network adapter 24 is connected to bus 28 and Internet 20 for enabling communication between the computer browser client 12 and network devices.

Device adapter 26 is connected to bus 28 and input devices 14 and output devices 16 for enabling communication between computer browser client 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures.

Memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally volatile memory is used because it is faster and generally non-volatile memory is used because it will hold the data for longer. Computer browser client 12 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of the preferred embodiment comprises rendering engine 100 and browser occlusion engine 200. In one embodiment, ROM in the memory 30 stores modules 100 and 200 such that the computer browser client 12 functions as a special purpose computer specific to modules 100 and 200. Further program modules that support the preferred embodiment but are not shown include firmware, boot strap program, operating system, and support applications. Each of the operating system, support applications, other program modules, and program data or some combination thereof, may include an implementation of a networking environment.

Computer browser client 12 communicates with at least one network (such as a local area network (LAN), a general wide area network (WAN), and/or a public network like the Internet 20) via network adapter 24. Network adapter 24 communicates with the other components of computer browser client 12 via bus 28. It should be understood that although not shown, other hardware and/or software components could be used in conjunction with computer browser client 12. Examples, include, but are not limited to: microcode, device drivers, redundant processing units, external disk drive arrays, redundant array of independent disks (RAID), tape drives, and data archival storage systems.

Rendering engine 100 provides browser functionality for computer browser client 12 including interacting with Internet server 11 to download a Web page. The Web page contains primary objects which are downloaded by rendering engine 100. The primary objects reference secondary objects which reference further objects and all secondary and further objects are downloaded by rendering engine 100. One or more scripts are contained or referenced by the Web page and rendering engine performs the script against the downloaded objects. Rendering engine 100 selects graphical objects in a view and, if using a conventional technique, would have them all rendered by the GPU 22B. In contrast to conventional techniques, in accordance with aspects described herein the rendering engine 100 has the selected graphical objects processed by browser occlusion engine 200 before rendering.

In aspects, the browser occlusion engine 200 processes the selected graphical objects to optimize the number of objects needed for rendering.

Figure 2:
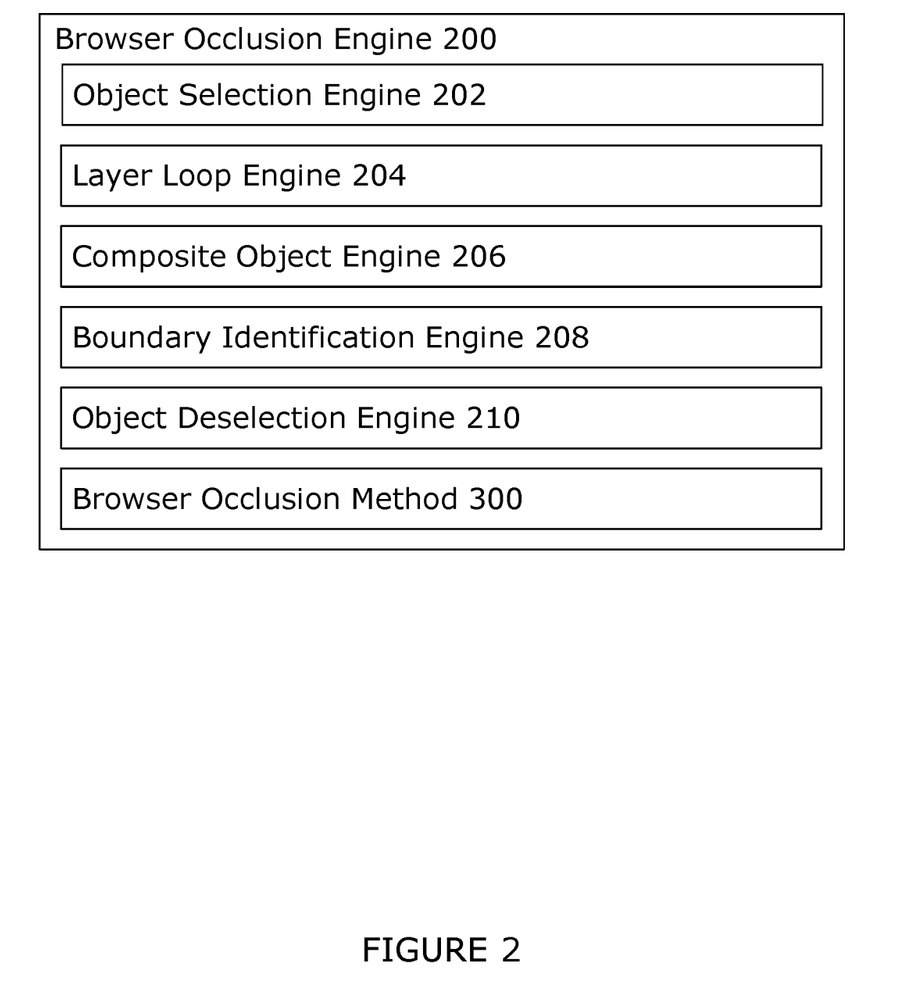
FIG. 2 is a component diagram of an engine in accordance with aspects of the invention.

Referring to FIG. 2, browser occlusion engine 200 may comprise the following components: object selection engine 202; layer loop engine 204; composite object engine 206; boundary identification engine 208; object deselection engine 210; and browser occlusion method 300.

Object selection engine 202 is configured for having all relevant graphical objects selected. In a first rendering of a view then all graphical objects in the view will be selected if their boundaries are in the view. In subsequent renderings, only the objects that have changed will need to be considered.

Layer loop engine 204 is for setting the highest layer as current layer and considering graphical objects in that current layer before setting layers beneath the current layer to the new current layer and looping through all the layers until the lowest layer is reached. All graphical objects are considered whether or not they are selected graphical objects that have changed.

Composite object engine 206 is configured for creating a composite graphical object of all opaque graphical objects in the current layer and then adding further graphical objects as further levels are considered.

Boundary identification engine 208 is configured for calculating the boundary of each graphical object so to determine if it falls within a view; to determine if it is occluded by the boundary of the composite graphical object; and for use in adapting the composite graphical object to accommodate further graphical objects and their boundaries.

Object deselection engine 210 is configured for deselecting graphical objects in the layer beneath the current layer that are occluded by the composite graphical object.

Browser occlusion method 300 is configured for controlling the components according to the steps of a method of the preferred embodiment.

In embodiments, graphical objects in document object model layers are examined to see if those graphical objects occlude any other graphical object. It is assumed that the identification of layers has already been done by the browser. This is either achieved via a browser-specific heuristic method or can be explicitly set by the web developer using Z-Index properties. At any given point in time, there are a number of events that can trigger a re-draw of a Web page. One such example of this is applying a cascading style sheet transformation to an element. When a redraw happens the optimizations can be made.

Figure 3:
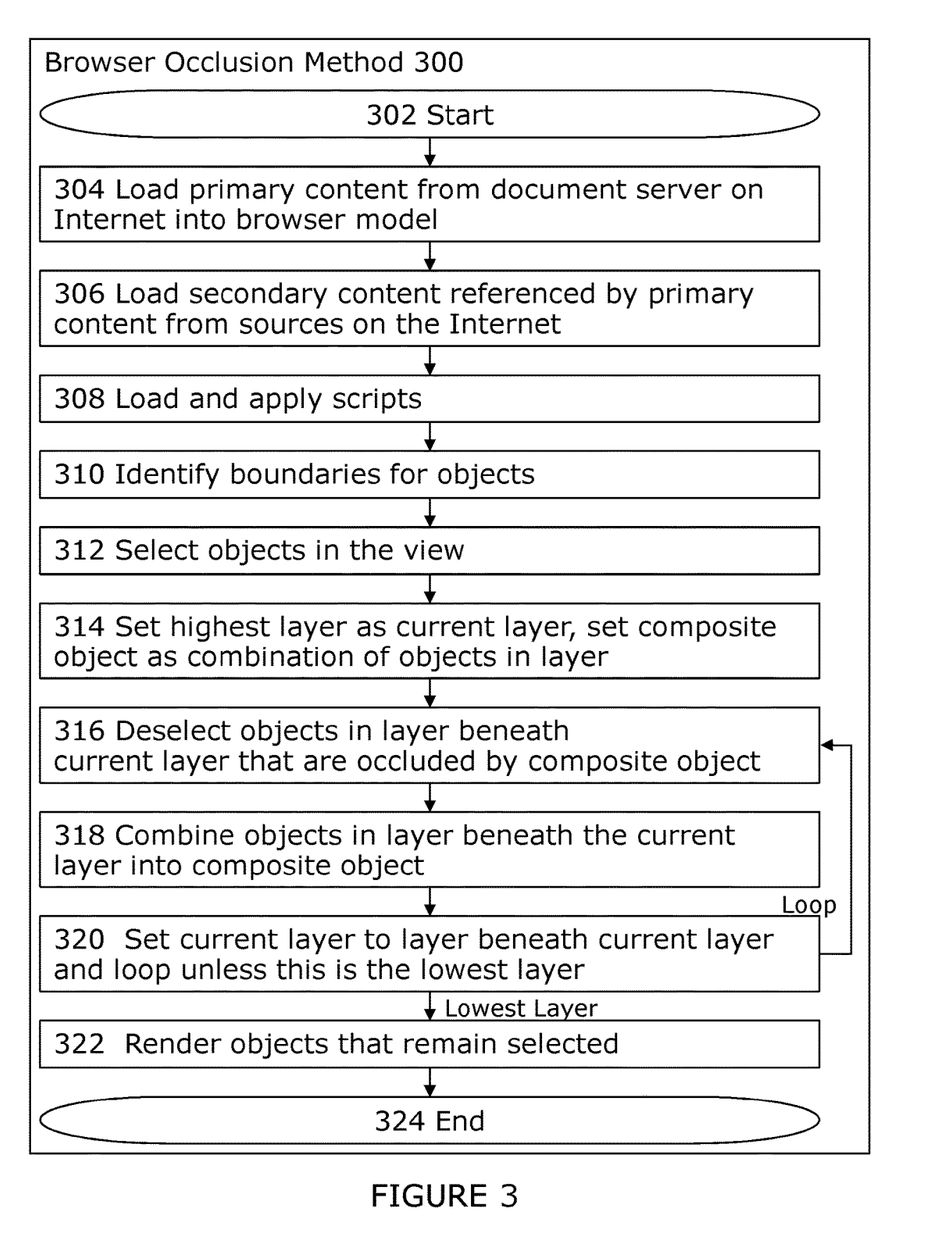
FIG. 3 is a flow diagram of a process in accordance with aspects of the invention.

Referring to FIG. 3, an exemplary browser occlusion method 300 comprises logical process steps 302 to 324 for managing rendering of graphical objects in a client browser view, said client browser having an object model for organizing graphical objects in a lower layer and one or more higher layers. Although there is an order to the steps as described, the steps may not necessarily need to be in this order unless specified and in other embodiments steps can be in a different order. In embodiments, and as described with respect to FIGS. 4A-D and FIG. 5, the steps of the method are performed by one or more of the modules described with respect to FIGS. 1B and 2.

Step 302 is the start of the method initiated when graphical objects are required to be rendered.

Step 304 includes downloading two or more graphical objects from a server into the lower layer and/or higher layer/s of object model. In the preferred embodiment the step comprises downloading two or more primary graphical objects from a server into the lower layer and/or higher layer/s of object model.

Step 306 includes downloading two or more secondary graphical objects, referenced by the primary graphical objects, into the lower layer and/or higher layer/s of object model.

Step 308 includes downloading a script associated with the graphical objects and applying a script to the downloaded graphical objects.

Step 310 includes identifying the boundaries of the objects and the view.

Step 312 includes selecting two or more downloaded graphical objects in the object model for display in the client browser view. Selection can be all the graphical objects for a new rendering (for instance if the view has changed) or just the graphical objects that have changed since the last rendering if the view is the same.

Step 314 includes setting a current layer as the highest layer and forming a composite graphical object with a combined boundary as a combination of opaque objects in the highest layer.

Step 316 includes deselecting one or more selected graphical objects in a lower layer that are occluded by one or more graphical objects in a higher layer or above. In the preferred embodiment the step further comprises deselecting one or more selected graphical objects in a lower layer that are occluded by one or more opaque graphical objects in a higher layer or above. In the preferred embodiment, the step comprises deselecting graphical objects in layers beneath the current layer that are occluded by the composite graphical object.

Step 318 includes combining graphical objects in the layer beneath the current object into the composite graphical object so that the graphical object boundaries are combined where possible.

Step 320 includes setting the current layer to the layer below the current layer and repeating from step 316 unless the lower layer is reached. If the lower layer is reached, then the process moves to step 322.

Step 322 includes rendering the graphical objects that remain selected. In the preferred embodiment, this is achieved by returning control to rendering engine 100 to render the remaining selected graphical objects.

Step 324 is the end of the browser occlusion method 300.

Referring to FIGS. 4A, 4B, 4C and 4D an example of an embodiment is described with respect to stages of processing graphical objects in the object model. FIG. 5 shows a browser window with the rendered graphical objects.

Figure 4A:
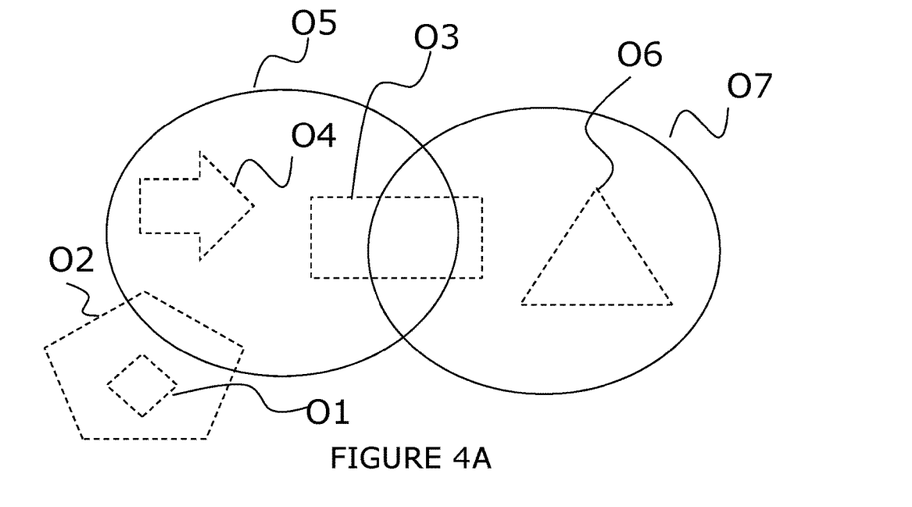
FIGS. 4A to 4D show stages of graphical objects in a layered object model example in accordance with aspects of the invention.
Figure 5:
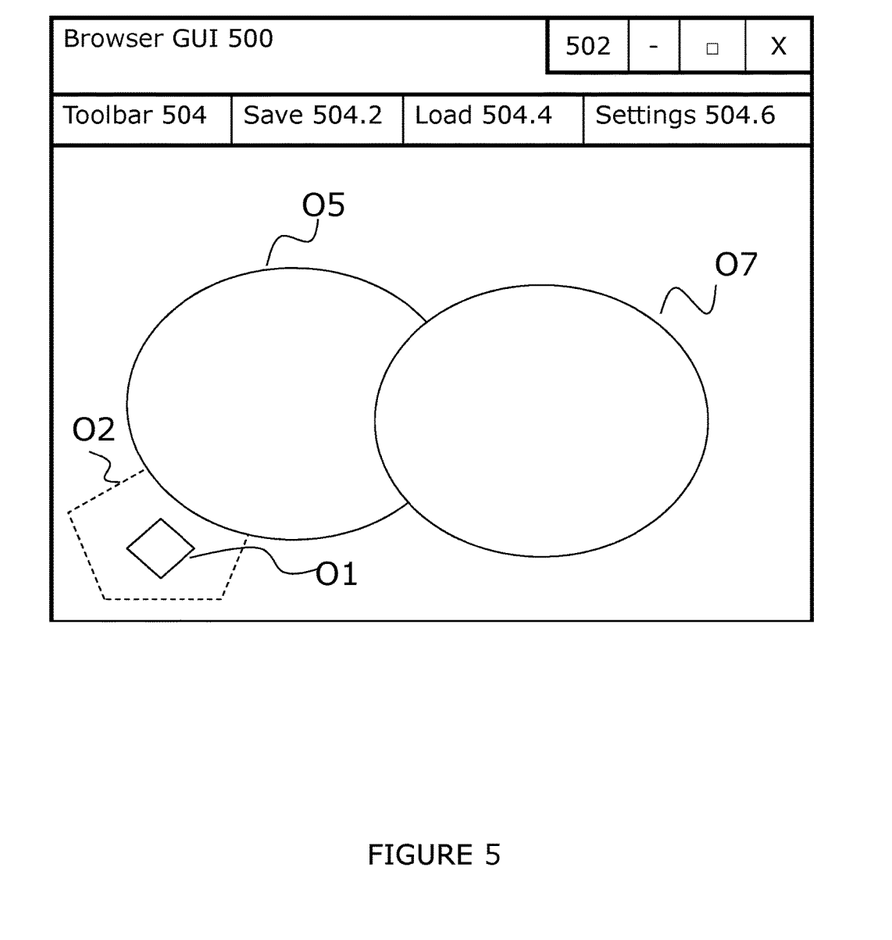
FIG. 5 is a browser screen showing the rendered graphical objects of the example in accordance with aspects of the invention.

Referring to FIG. 4A, the first stage of processing graphical objects using the preferred embodiment is described.

At the start (step 302), browser occlusion method 300 is initiated when graphical objects are required to be rendered.

Two (solid line opaque circles O5 and O7) graphical objects (primary objects) are downloaded (step 304) from a server into the lower layer (L5) and higher layer (L7) of the object model. Opaqueness is considered but not represented in FIGS. 4A to 4D. Each graphical object is referenced by an object number (O7 to O1) and in this example the object number matches an layer number for indicating which object model layer (L7 to L1) that the object is associated with. In a more complex example, object numbers would not match layer numbers.

Secondary graphical objects comprise: dashed opaque triangle O6, dashed opaque arrow O4, dashed opaque rectangle O3, dashed transparent pentagon O2 and dashed opaque diamond O1. All secondary graphical objects are referenced by the primary objects or otherwise in Web document and are also downloaded (step 306) into the layers L6, L4, L3, L2 and L1. The objects and layers are defined in the Web document so that the layers of the object model can be populated as required.

A script associated with the graphical objects is downloaded and applied (step 308) to the downloaded graphical objects. In this case the script is for confirming the that graphical objects are located in the layers as indicated but in other examples the positions of the objects could be switched.

The boundaries of the objects are identified (step 310) as within the view.

All the graphical objects within the view are selected (step 312) in the object model for display. In this example, all the graphical objects are selected because it is a new rendering.

A current layer is set (step 314) as the highest layer (L7) and a composite graphical object is formed from circle O7.

Figure 4B:
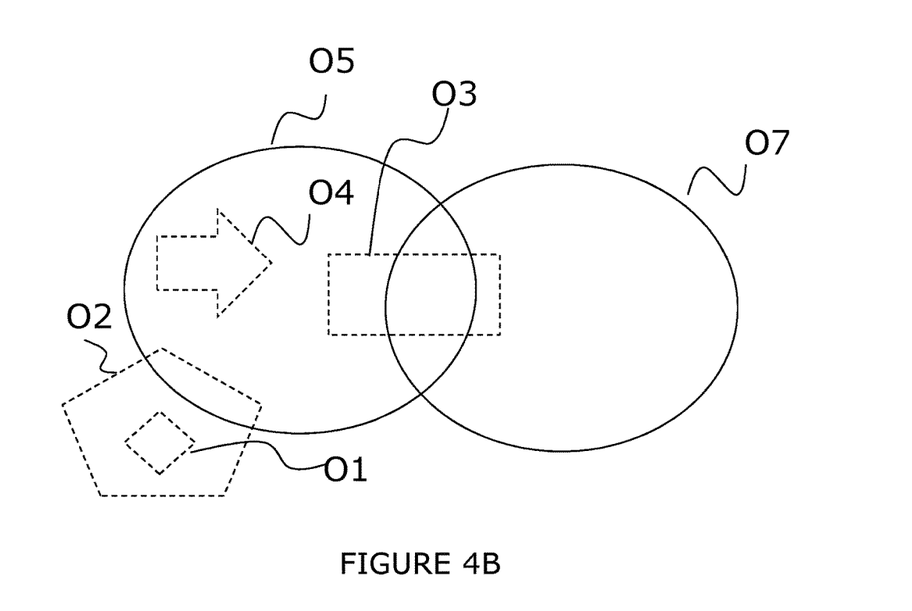

Referring to FIG. 4B, triangle O6 in layer L6 is not shown because it has been deselected (step 316.1) due to it being in a lower layer (L6) and occluded by the opaque circle O6 (actually composite graphical object O7) in a layer L7. In the following description, a step may have a numbered suffix (.1, .2 to 5) for indicating that the step is going through a further iteration. For example, step 316.1 is the first further iteration (the second time) that the step has been invoked."

Since triangle O6 is the only shape in layer L6 and it is occluded then there is no need to combine it into the composite graphical object (step 318.1 is skipped). Alternately it can be combined with no consequence.

The current layer L7 is set (step 320.1) to the layer below the current layer L6 and the process is repeated from step 316.

No object is deselected (step 316.2) in the layer (L5) below the current layer (L6) because circle O5 is not occluded by composite graphical object (O7) of layer L6.

Circle O5 is combined (step 318.2) with composite graphical object (O7) to form composite graphical object (O7/O5) represented by combined circles O7 and O5 in layer L5.

The current layer L6 is set (step 320.2) to layer L5 and the process is repeated from step 316.

Figure 4C:
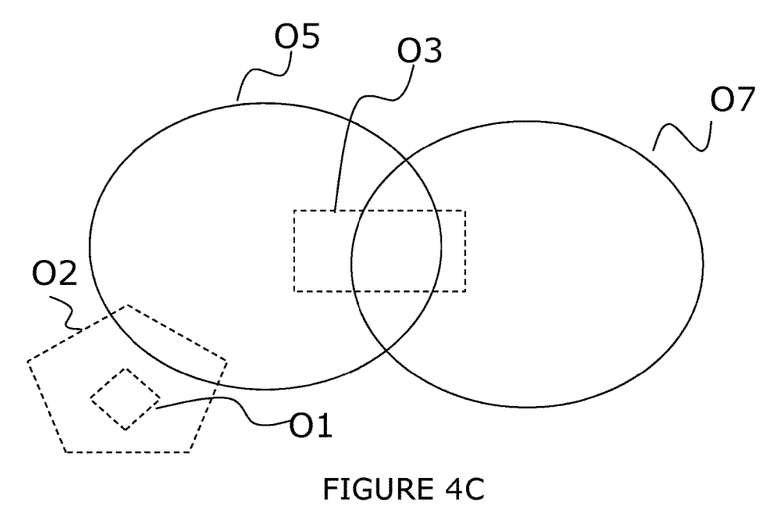

Referring to FIG. 4C, arrow O4 in layer L4 is not shown because it has been deselected (step 316.3) due to it being in a lower layer (L4) and occluded by the opaque composite graphical object O7/O5 of layer L5.

Since arrow O4 is the only shape in layer L4 and it is occluded then there is no need to combine it into the composite graphical object (step 318.3 is skipped).

The current layer L5 is set (step 320.3) to layer L4 and the process is repeated from step 316.

Figure 4D:
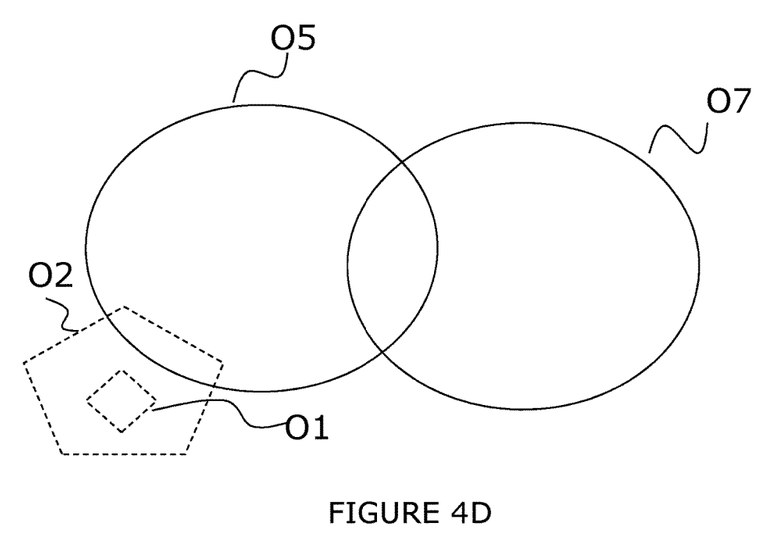

Referring to FIG. 4D, rectangle O3 in layer L3 is not shown because it has been deselected (step 316.4) due to it being in a lower layer (L3) and occluded by the opaque composite graphical object O7/O5 of layer L5. This is an example of a graphical object being occluded by the composite graphical object whereas it would not be occluded by the individual graphical objects that make up the composite graphical object.

Since rectangle O3 is the only shape in layer L3 and it is occluded then there is no need to combine it into the composite graphical object (step 318.4 is skipped).

The current layer L4 is set (step 320.4) to layer L3 and the process is repeated from step 316.

No object is deselected (step 316.5) in the layer (L2) below the current layer (L3) because pentagon O2 is not occluded by composite graphical object (O7/O5) of layer L3.

Pentagon O2 is not combined (step 318.5) with composite graphical object (O7/O5) because it is not opaque.

The current layer L3 is set (step 320.5) to layer L2 and the process is repeated from step 316.

Diamond O1 is not deselected (step 316.6) in the layer (L1) below the current layer (L2) because diamond O1 is not occluded by composite graphical object (O7/O5) of layer L3 (and also graphical object O2 is not opaque).

However, diamond O1 is combined (step 318.6) into composite graphical object (O7/O5/O1) because it is opaque.

The current layer L2 is not set (step 320.6) to layer L1 because this is the lowest layer and the process moves on to step 322.

Referring to FIG. 5, an example browser screen shows the final state of browser graphical user interface (GUI) 500 of the preferred embodiment. GUI 500 comprises: window control 502; and toolbar 504.

Window control 502 provides for minimizing; maximizing and closing of the GUI 500. Toolbar 504 provides the following controls: save 504.2; load 504.4; and settings 504.8. Save 504.2 is a control for saving input data in a particular state. Load 504.4 is a control for loading prompt and user data. These or other controls may be provide in the toolbar 504 for saving and loading of prompt and user data. Setting 504.6 provides a user control to change setting for opening GUI 500.

The graphical objects that remain selected are: opaque circle O7, opaque circle L5, transparent pentagon O2 and opaque diamond O1. Control is returned to rendering engine 100 to render graphical objects O7, O5, O2 and O1.

O7 is an opaque circle in highest layer L7. O5 is an opaque circle in lower layer L5. O2 is a transparent (non-opaque) pentagon in lower layer L2. O1 is an opaque diamond in lower layer L1 that can be seen beneath transparent pentagon O2.

Another embodiment considers using co-ordinates and bounding boxes to calculate boundaries. The processing for the browser is applied which already creates a subset of all the layers based on those that have changed. Before these layers are re-rendered they are processed. For each updated layer the co-ordinates for the bounding box of the layer are needed. The top most graphical object is determined from these co-ordinates by existing rendering engine functions for getting an element from a point (co-ordinate). The opacity of this graphical object is checked and if it is opaque then the graphical object is temporarily removed and the process repeated. If this graphical object has not already been identified previously then use the graphical object to get its bounding rectangle via an existing rendering engine method that acquires a bounding client rectangle. Once the bounding rectangle is acquired then an initial check is performed to see if this rectangle entirely covers the current layer. If the DOM object covers the layer then this layer can be removed from the list to process and therefore optimize the rendering. Implementations of the invention thus provide improvements to the function of the computer system performing the rendering by optimizing the rendering. Note that this approach is a simple example and only covers basic scenario. There are other such scenarios where the bounding box covers a layer below but because of the orientation of the content in the bounding box the layer below is not entirely covered.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A Web browser system, comprising:
   a processor, a computer readable memory, and a computer readable storage medium associated with a computer device;
   program instructions to organize objects in layers including a lowest layer, one or more higher layers above the lowest layer, and a highest layer;
   program instructions to load two or more objects from a server into the layers of the object model and for rendering selected objects in a Web browser view;
   program instructions to download a script associated with the objects and to apply a script to the objects, after the objects have been loaded into the layers of the object model, wherein the script confirms that the objects are located in the respective layers they are loaded into;
   program instructions to calculate boundaries of the objects using coordinates and boundary boxes, after the script has been downloaded and applied;
   program instructions to select two or more loaded objects in the object model for display in the client browser view, after the boundaries of the objects have been calculated;
   program instructions to deselect one or more selected objects in a lower layer that are occluded by one or more objects in a higher layer or above;
   program instructions to set the highest layer as a first current layer;
   program instructions to set a next lowest layer underneath the highest layer as a new current layer;
   program instructions to deselect one or more selected objects in the new current layer that are occluded by one or more opaque objects in the highest layer; and
   program instructions to repeat setting a next lowest layer underneath a most recent new current layer as the next new current layer and deselecting one or more objects in the next new current layer until the lowest layer is reached and selected objects in the lowest layer which are occluded by one or more opaque objects in the layers above the lowest layer are deselected,
   wherein the program instructions are stored on the computer readable storage medium for execution by the processor via the computer readable memory.

2. The Web browser system according to claim 1 further comprising:
   program instructions to load two or more primary objects from a server into one or more of the lower layer and the one or more higher layers of the object model; and
   program instructions to load two or more secondary objects, referenced by the primary objects, into one or more of the lower layer and the one or more higher layers of the object model.

3. The Web browser system according to claim 1 further comprising:
   program instructions to set a composite object as combination of objects in current layer.

4. A computer implemented method for managing rendering of objects in a client browser view, said client browser having an object model for organizing graphical objects in layers including in a lower layer and one or more higher layers, the method comprising:
   loading, by a computer device, two or more objects from a server into one or more of the lower layer and the one or more higher layers of the object model;
   loading a script associated with the objects, after the objects have been loaded into the lower layer and the one or more higher layers of the object model;
   applying the script to the objects, wherein the script confirms that the objects are located in the respective layers they are loaded into;
   calculating boundaries of the objects using coordinates and boundary boxes after the script has been downloaded and applied;
   selecting, by the computer device, two or more loaded objects in the object model for display in the client browser view after the boundaries of the objects have been calculated;
   deselecting, by the computer device, one or more selected objects in a lower layer that are occluded by one or more graphical objects in a higher layer or above; and
   rendering, by the computer device, the objects that remain selected.

5. The method according to claim 4 further comprising deselecting one or more selected objects in a lower layer that are occluded by one or more opaque objects in a higher layer or above.

6. The method according to claim 4 further comprising:
   loading two or more primary objects from a server into the one or more of the lower layer and the one or more higher layers of the object model; and
   loading two or more secondary objects, referenced by the primary objects, into the one or more of the lower layer and the one or more higher layers of the object model.

7. The method according to claim 4 further comprising:
   setting a current layer as the highest layer;

setting composite object as combination of objects in current layer;

deselecting objects in layers beneath the current layer that are occluded by composite object; and setting the current layer to the layer below the current layer and repeating until the lower layer is reached.

8. A computer program product for managing rendering of objects in a client browser view, said client browser having an object model for organizing objects in layers including in a lowest layer, one or more higher layers above the lowest layer, and a highest layer, the computer program product comprising a computer readable storage medium having program instructions embodied therewith, the program instructions executable by a processor to cause the processor to:

load two or more objects from a server into one or more of the lowest layer and the one or more higher layers of the object model;

download a script associated with the objects and apply the script to the objects, after the objects have been loaded into the lowest layer and one or more higher layers of the object model, wherein the script confirms that the objects are located in the respective layers they are loaded into;

program instructions to calculate boundaries of the objects using coordinates and boundary boxes, after the script has been downloaded and applied;

select two or more loaded objects in the object model for display in the client browser view, after the boundaries of the objects have been calculated;

deselect one or more selected objects in a lower layer that are occluded by one or more objects in a higher layer or above; and render the objects that remain selected, further comprising program instructions of a layer loop executable by a processor to cause the processor to:

set the highest layer as a first current layer;

set a next lowest layer underneath the highest layer as a new current layer;

deselect one or more selected objects in the new current layer that are occluded by one or more opaque objects in the highest layer; and repeat setting a next lowest layer underneath a most recent new current layer as the next new current layer and deselecting one or more objects in the next new current layer until the lowest layer is reached and selected objects in the lowest layer which are occluded by one or more opaque objects in the layers above the lowest layer are deselected.

9. The computer program product according to claim 8 wherein the program instructions cause the processor to:

loading two or more primary objects from a server into the one or more of the lowest layer and the one or more higher layers of the object model; and loading two or more secondary objects, referenced by the primary objects, into the one or more of the lowest layer and the one or more higher layers of the object model.

10. The computer program product according to claim 8 wherein the program instructions cause the processor to:

set a composite object as combination of objects in current layer.

* * * * *